United States Patent
Mae et al.

(10) Patent No.: US 10,284,061 B2
(45) Date of Patent: May 7, 2019

(54) ROTOR OF PERMANENT MAGNET-TYPE ROTARY ELECTRIC MACHINE

(71) Applicant: FUJI ELECTRIC CO., LTD., Kawasaki (JP)

(72) Inventors: Kenichi Mae, Kanagawa (JP); Toshiharu Mochida, Kanagawa (JP); Masao Shuto, Kanagawa (JP); Hirofumi Nishimura, Kanagawa (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 2 days.

(21) Appl. No.: 14/917,735

(22) PCT Filed: May 12, 2015

(86) PCT No.: PCT/JP2015/002402
§ 371 (c)(1),
(2) Date: Mar. 9, 2016

(87) PCT Pub. No.: WO2015/190033
PCT Pub. Date: Dec. 17, 2015

(65) Prior Publication Data
US 2017/0085160 A1   Mar. 23, 2017

(30) Foreign Application Priority Data
Jun. 9, 2014  (JP) ................ 2014-118798

(51) Int. Cl.
*H02K 1/27*   (2006.01)
*H02K 1/28*   (2006.01)
*H02K 15/03*  (2006.01)

(52) U.S. Cl.
CPC .......... *H02K 15/03* (2013.01); *H02K 1/276* (2013.01); *H02K 1/2706* (2013.01); *H02K 1/28* (2013.01)

(58) Field of Classification Search
CPC ................ H02K 1/27–1/2793; H02K 1/28
USPC ......... 310/156.01–156.84, 216.113, 216.114, 310/216.129, 400, 410, 411
See application file for complete search history.

(56) References Cited

U.S. PATENT DOCUMENTS 4,697,114 A * 9/1987 Amemiya ............ H02K 1/2773
29/598
2004/0256940 A1   12/2004 Tsuruta et al.
2005/0285468 A1 * 12/2005 Fukushima .......... H02K 1/2706
310/156.53

(Continued)

FOREIGN PATENT DOCUMENTS

CN         202309273        7/2012
DE   10 2006 022 362 A1   11/2007

(Continued)

OTHER PUBLICATIONS

Machine Translation, Kinoshita, JP 61150640 A, Jul. 1986.*

(Continued)

*Primary Examiner* — Thomas Truong

(57) ABSTRACT

Provided is a rotor (1) of a permanent magnet-type electric rotary machine, the rotor being able to restrain a decrease of a magnetic characteristic. A pair of endplates (6a, 6b) placed at both axial ends of a rotor core (3) are each provided with a pressing portion (10, 10) configured to abut with an outer peripheral side of an end of the rotor core (3) to apply a pressing force toward the other end plate.

10 Claims, 7 Drawing Sheets

(56) References Cited

U.S. PATENT DOCUMENTS

2008/0174200 A1 7/2008 Okamoto et al.
2012/0181894 A1 7/2012 Asaga et al.
2012/0248920 A1* 10/2012 Takahashi .............. H02K 1/276
310/156.61

FOREIGN PATENT DOCUMENTS

| JP | 61150640 A | * | 7/1986 | ........... H02K 1/2733 |
|---|---|---|---|---|
| JP | 2003-259577 | | 9/2003 | |
| JP | 2003259577 A | * | 9/2003 | |
| JP | 2005-39909 | | 2/2005 | |
| JP | 2005-102460 | | 4/2005 | |
| JP | 2008-178253 | | 7/2008 | |
| JP | 2012-217287 | | 11/2012 | |
| JP | 2013-138588 | | 7/2013 | |
| JP | 2014-87103 | | 5/2014 | |
| JP | 2014087103 A | * | 5/2014 | |

OTHER PUBLICATIONS

Machine Translation, Shingo, JP 2003259577 A, Sep. 2003.*
Machine Translation, Sotoki , JP 2014087103 A. (Year: 2014).*
Chinese Office Action dated May 27, 2017 in corresponding Chinese Patent Application No. 201580001810.1.
International Preliminary Report on Patentability dated Dec. 22, 2016 in corresponding International Patent Application No. PCT/JP2015/002402.
International Search Report dated Jul. 28, 2015, in corresponding International Application No. PCT/JP2015/002402.
Extended European Search Report dated Jul. 13, 2017 in corresponding European Patent Application No. 15807567.1.
Office Action dated May 8, 2018, in corresponding Japanese Patent Application No. 2016-527618, 9 pgs.

* cited by examiner

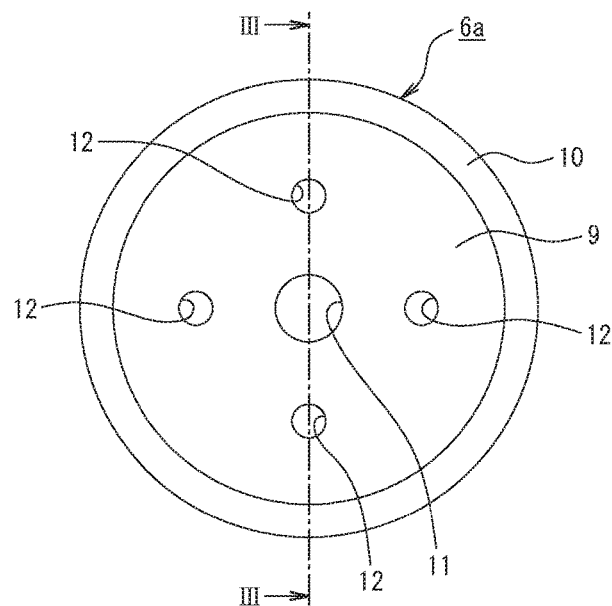
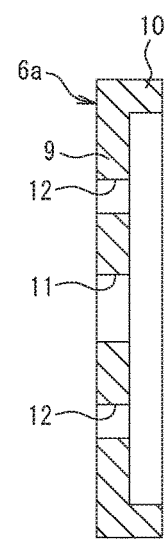
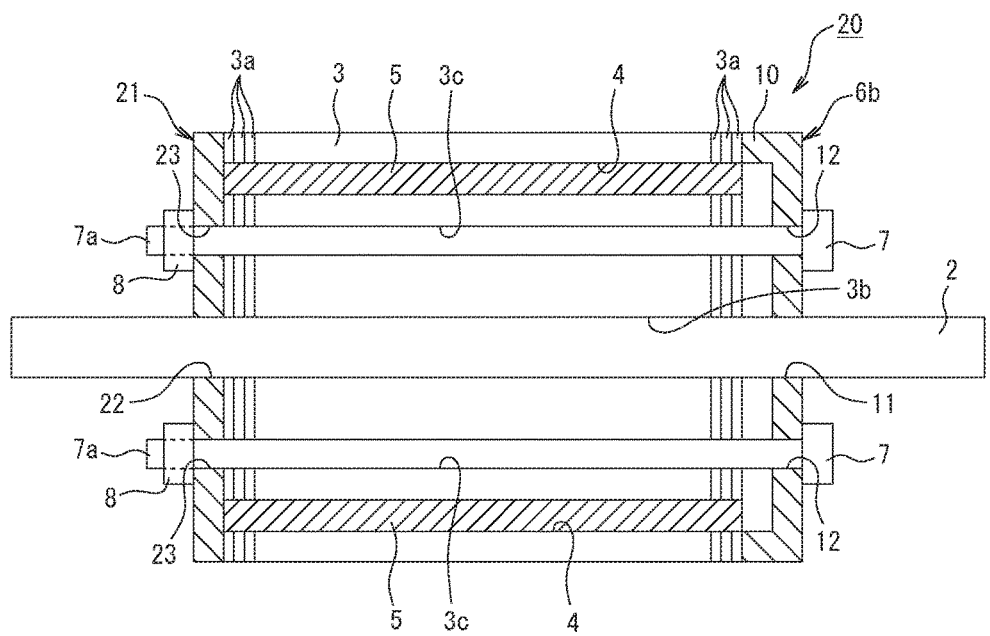

ROTOR OF PERMANENT MAGNET-TYPE ROTARY ELECTRIC MACHINE

CROSS-REFERENCE TO RELATED APPLICATIONS

This application is a U.S. National Stage Application, which claims the benefit under 35 U.S.C. § 371 of PCT International Patent Application No. PCT/JP2015/002402, filed May 12, 2015, which claims the foreign priority benefit under 35 U.S.C. § 119 of Japanese Patent Application No. 2014-118798, filed Jun. 9, 2014, the contents of which are incorporated herein by reference.

TECHNICAL FIELD

The present invention relates to a rotor of a permanent magnet-type rotary electric machine, the rotor being placed in a rotatable manner via a gap from an inner peripheral surface of a stator.

BACKGROUND ART

A rotor of a permanent magnet-type rotary electric machine is configured by laminating a plurality of electromagnetic steel sheets, and includes: a rotor core fixed so as to rotate integrally with a rotating shaft penetrating therethrough; a plurality of rotor slots provided at regular intervals in a circumferential direction of the rotor core so as to be extended in an axial direction; and a plurality of permanent magnets inserted into the rotor slots.

The dimension accuracy of the permanent magnets varies at the time of molding or machining, and the rotor slots formed in the rotor core are formed with a dimension larger than the permanent magnets. Accordingly, at the time when the rotor rotates or stops, the permanent magnets in the rotor slots may move to cause collision noise.

In view of this, for example, in PTL 1, a pair of end plates placed at both axial ends of a rotor core are fixed so that a rotating shaft penetrates therethrough and rotate integrally therewith, and hole portions are provided in the end plates at positions corresponding to rotor slots. When pressing members inserted into the hole portions abut with permanent magnets in the rotor slots, movements of the permanent magnets are regulated, to prevent an occurrence of collision noise.

CITATION LIST

Patent Literature

PTL 1: JP 2013-138588 A

SUMMARY OF INVENTION

Technical Problem

In the meantime, a plurality of electromagnetic steel sheets constituting the rotor core includes many members with uneven plate thicknesses. Outer peripheral sides of the electromagnetic steel sheets are not fixed to the rotating shaft, so adjacent outer peripheral sides might be spaced from each other.

The pair of endplates in PTL 1 can regulate the movements of the permanent magnets in the rotor slots by the pressing members inserted into the hole portions. However, those parts of the end plates which make contact with outer peripheral sides of both ends of the rotor core have a flat surface, so they cannot correct the space between the outer peripheral sides of the electromagnetic steel sheets. This may decrease a magnetic characteristic of the rotor.

In view of this, the present invention is intended to provide a rotor of a permanent magnet-type rotary electric machine, the rotor being able to restrain a decrease of a magnetic characteristic.

Solution to Problem

In order to achieve the above object, a rotor of a permanent magnet-type rotary electric machine according to one aspect of the present invention includes a rotating shaft, a rotor core constituted by laminating a plurality of electromagnetic steel sheets, the rotor core through which the rotating shaft penetrates so as to be fixed thereto, a plurality of rotor slots formed so as to axially penetrate through the rotor core, a plurality of permanent magnets inserted into the rotor slots, and a pair of endplates placed at both axial ends of the rotor core. At least one endplate out of the pair of end plates is provided with a pressing portion configured to abut with an outer peripheral side of the rotor core so as to apply a pressing force thereto.

Advantageous Effects of Invention

According to the rotor of the permanent magnet-type rotary electric machine according to the present invention, at least one endplate out of the pair of endplates is provided with the pressing portion configured to abut with the outer peripheral side of one axial end of the rotor core to apply a pressing force toward the other end plate. Accordingly, even when plate thicknesses of the laminated electromagnetic steel sheets are uneven, it is possible to surely eliminate a space on the outer peripheral side of the electromagnetic steel sheets and prevent a decrease of a magnetic characteristic of the rotor.

BRIEF DESCRIPTION OF DRAWINGS

FIG. 3 is a view illustrating an end plate constituting the rotor of the permanent magnet-type rotary electric machine according to the first embodiment of the present invention;

FIG. 4 is a sectional view illustrating a rotor of a permanent magnet-type rotary electric machine according to a second embodiment of the present invention;

DESCRIPTION OF EMBODIMENTS

The following describes an embodiment for carrying out the present invention (hereinafter referred to as "embodiment") in detail with reference to the drawings.

First Embodiment

Figure 1:
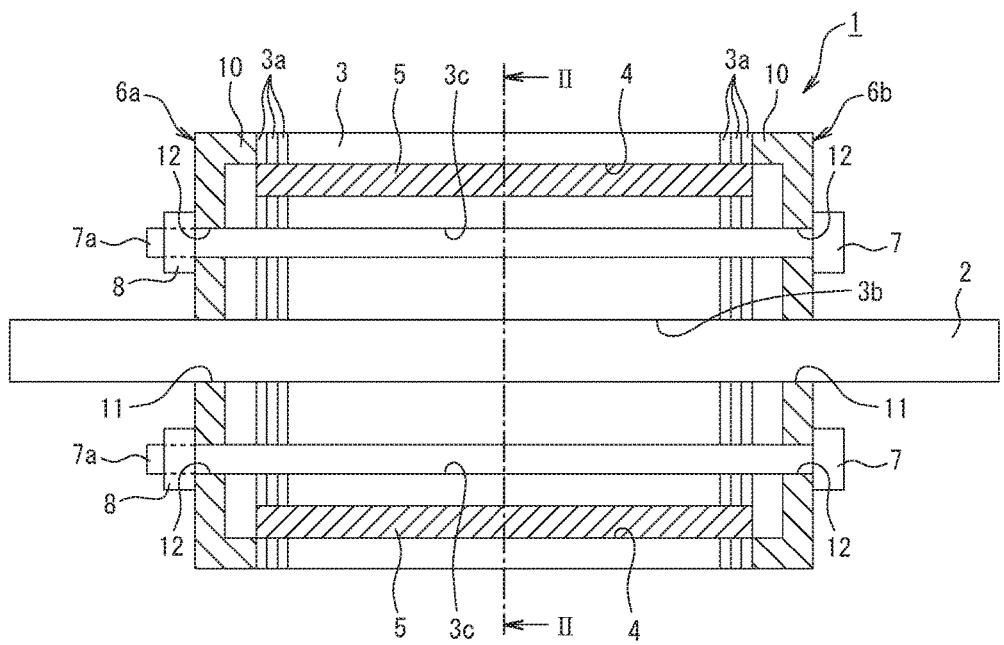
FIG. 1 is a sectional view illustrating a rotor of a permanent magnet-type rotary electric machine according to a first embodiment of the present invention.
Figure 2:
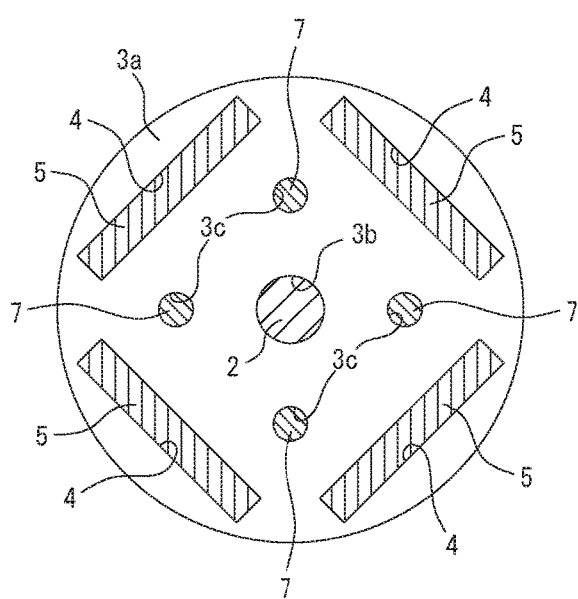
FIG. 2 is an arrow view along a line II-II in FIG. 1.

FIGS. 1 to 3 illustrate a rotor 1 of a permanent magnet-type rotary electric machine according to a first embodiment. The permanent magnet-type rotary electric machine includes a stator (not illustrated), and the rotor 1 placed in a rotatable manner via a gap from an inner peripheral surface of the stator.

As illustrated in FIGS. 1 and 2, the rotor 1 includes: a rotating shaft 2; a rotor core 3 through which the rotating shaft 2 penetrates so as to be fixed thereto in an integrally rotatable manner; a plurality of rotor slots 4 provided at regular intervals in a circumferential direction of an inside of the rotor core 3 and formed to penetrate therethrough in an axial direction; a plurality of permanent magnets 5 inserted into the rotor slots 4; a pair of end plates 6a, 6b placed at both axial ends of the rotor core 3; a plurality of clamping bolts 7 placed to penetrate through the rotor core 3 and the pair of end plates 6a, 6b; and nuts 8 screwed onto threaded portions 7a at tips of respective clamping bolts 7. Note that an adhesive (not illustrated) is applied to an inner surface of the rotor slot 4, so that the permanent magnet 5 inserted into the rotor slot 4 is fixed to the inner surface of the rotor slot 4 via the adhesive.

The rotor core 3 is configured by a plurality of electromagnetic steel sheets 3a. As illustrated in FIG. 2, each of the electromagnetic steel sheets 3a has the plurality of rotor slots 4, a shaft through hole 3b through which the rotating shaft 2 penetrates, and bolt through holes 3c through which the plurality of clamping bolts 7 penetrates. The plurality of electromagnetic steel sheets 3a is laminated in a plate-thickness direction, and the shaft through holes 3b of the electromagnetic steel sheets 3a thus laminated are shrink-fitted to the rotating shaft 2, so that the rotor core 3 is fixed to the rotating shaft 2 in an integrally rotatable manner therewith.

Further, as illustrated in FIGS. 3A, 3B, one end plate 6a out of the pair of end plates 6a, 6b includes: a circular flat portion 9 having generally the same outer shape as the electromagnetic steel sheets 3a constituting the rotor core 3; and an annular protruding portion 10 projecting from an outer edge of the circular flat portion 9 in a direction perpendicular to a plane of the circular flat portion 9. In the circular flat portion 9, a shaft through hole 11 through which the rotating shaft 2 penetrates is formed in a central part thereof, and a plurality of bolt through holes 12 through which the clamping bolts 7 penetrate is formed around the shaft through hole 11. Further, the other end plate 6b out of the pair of end plates 6a, 6b also has the same shape as the one end plate 6a illustrated in FIGS. 3A, 3B.

Here, a pressing portion of the present invention corresponds to the annular protruding portion 10.

As illustrated in FIG. 1, the clamping bolts 7 are passed through the bolt through holes 12 of the pair of end plates 6a, 6b placed at both axial ends of the rotor core 3 and the bolt through holes 3c of the rotor core 3, and the nuts 8 are screwed onto the threaded portions 7a of the clamping bolts 7 to fasten the pair of endplates 6a, 6b. Hereby, the annular protruding portions 10 of the pair of end plates 6a, 6b abut with outer peripheries of the electromagnetic steel sheets 3a at both ends of the rotor core 3, to sandwich and press an outer peripheral side of the rotor core 3 toward an inner side in the axial direction.

According to the rotor 1 of the permanent magnet-type rotary electric machine according to the first embodiment, the annular protruding portions 10 of the pair of end plates 6a, 6b placed at both axial ends of the rotor core 3 abut with outer peripheries of the electromagnetic steel sheets 3a at both ends of the rotor core 3. By fastening the pair of end plates 6a, 6b by the clamping bolts 7 and the nuts 8, the annular protruding portions 10 of the pair of end plates 6a, 6b sandwich and press the outer peripheral side of the rotor core 3 toward the inner side in the axial direction. As such, even when plate thicknesses of the laminated electromagnetic steel sheets 3a are uneven, it is possible to surely eliminate a space on the outer peripheral side of the electromagnetic steel sheets 3a and to prevent a decrease of a magnetic characteristic of the rotor 1.

Next will be described rotors of permanent magnet-type rotary electric machines according to second to eighth embodiments. Note that a part having the same configuration as the first embodiment has the same reference sign, and a description thereof is omitted.

Second Embodiment

Subsequently, FIG. 4 illustrates a rotor 20 of a permanent magnet-type rotary electric machine according to the second embodiment in which some members have different configurations from the rotor 1 of the permanent magnet-type rotary electric machine according to the first embodiment.

In the rotor 20 of the second embodiment, a discoid end plate 21 is placed at one axial end of a rotor core 3. The discoid end plate 21 has generally the same outer shape as electromagnetic steel sheets 3a constituting the rotor core 3, and a shaft through hole 22 through which a rotating shaft 2 penetrates, and a plurality of bolt through holes 23 through which clamping bolts 7 penetrate are formed. Further, an end plate 6b having the same structure as the first embodiment is placed at the other axial end of the rotor core 3.

The clamping bolts 7 are passed through the bolt through holes 23, 12 of the end plates 21, 6b placed at both axial ends of the rotor core 3 and bolt through holes 3c of the rotor core 3, and nuts 8 are screwed onto threaded portions 7a of the clamping bolts 7 to fasten the endplates 21, 6b. Hereby, an annular protruding portion 10 of the end plate 66b abuts with an outer periphery of the electromagnetic steel sheet 3a at the other end of the rotor core 3, so that the annular protruding portion 10 and an outer peripheral side of the end plate 6b sandwich and press the rotor core 3 toward an inner side in the axial direction.

Accordingly, similarly to the rotor 1 of the first embodiment, even when plate thicknesses of the laminated electromagnetic steel sheets 3a are uneven, the rotor 20 of the second embodiment can surely eliminate a space on an outer peripheral side of the electromagnetic steel sheets 3a and prevent a decrease of a magnetic characteristic of the rotor 20.

Third Embodiment

Figure 5:
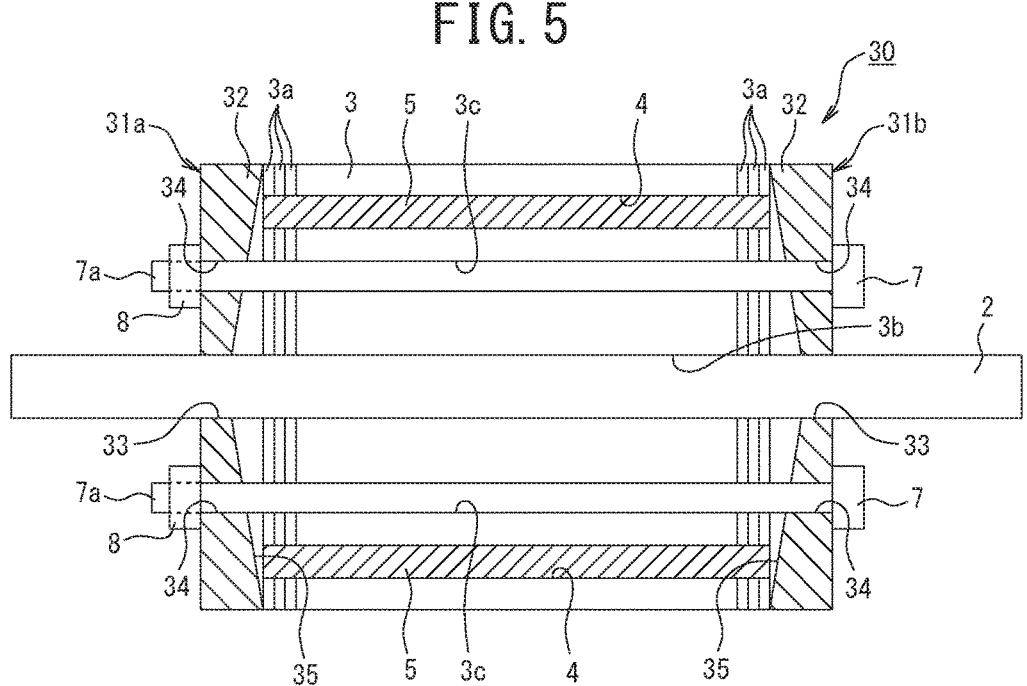
FIG. 5 is a sectional view illustrating a rotor of a permanent magnet-type rotary electric machine according to a third embodiment of the present invention.

Subsequently, FIGS. 5 and 6 illustrate a rotor 30 of a permanent magnet-type rotary electric machine according to a third embodiment.

The rotor 30 according to the third embodiment is different from the rotor 1 of the permanent magnet-type rotary electric machine according to the first embodiment in the structure of the end plates.

In the rotor 30 of the third embodiment, a pair of end plates 31a, 31b are placed at both axial ends of a rotor core 3.

Figure 6A:
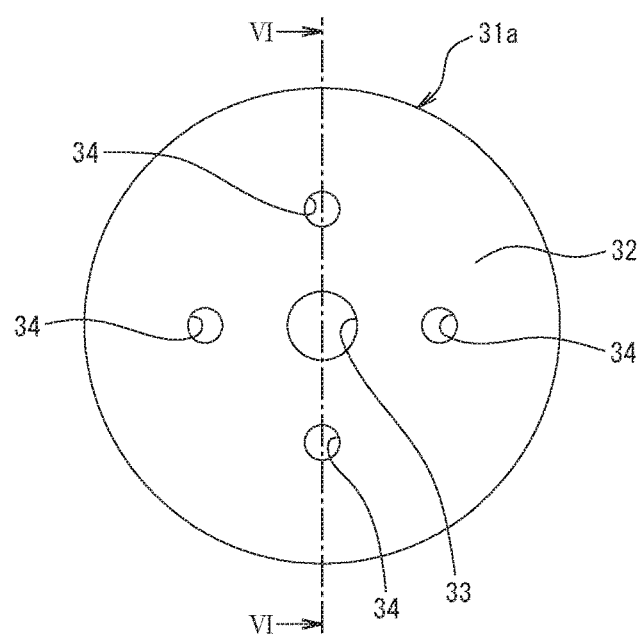
FIG. 6 is a view illustrating an end plate constituting the rotor of the permanent magnet-type rotary electric machine according to the third embodiment of the present invention.
Figure 6B:
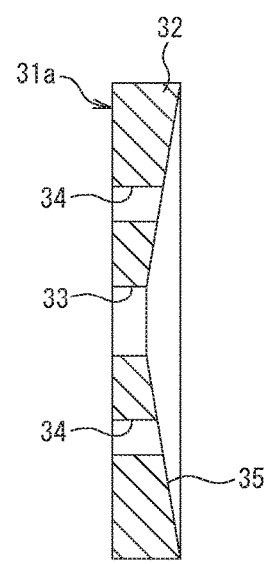

As illustrated in FIGS. 6A, 6B, one end plate 31a out of the pair of endplates 31a, 31b includes: a circular plate portion 32 having generally the same outer shape with electromagnetic steel sheets 3a constituting the rotor core 3; a shaft through hole 33 formed in a center of the circular plate portion 32 so that a rotating shaft 2 penetrates therethrough, and a plurality of bolt through holes 34 formed around the shaft through hole 33 so that clamping bolts 7 penetrate therethrough.

One surface, in a plate-thickness direction, of the circular plate portion 32 which surface abuts with an end of the rotor core 3 is formed as an inclined surface 35 such that its plate thickness is thickest in its outermost periphery and the plate thickness gradually decreases toward the shaft through hole 33 from the outermost periphery.

Further, the other end plate 31b out of the pair of end plates 31a, 31b also has the same shape as the one end plate 31a illustrated in FIGS. 6A, 6B.

Here, the pressing portion of the present invention corresponds to the thickest outermost periphery of the inclined surface 35.

As illustrated in FIG. 5, the clamping bolts 7 are passed through the bolt through holes 34 of the pair of end plates 31a, 31b placed at both axial ends of the rotor core 3 and bolt through holes 3c of the rotor core 3, and nuts 8 are screwed onto threaded portions 7a of the clamping bolts 7 to fasten the pair of endplates 31a, 31b. Hereby, the thickest parts of the inclined surfaces 35 of the pair of end plates 31a, 31b abut with outer peripheries of the electromagnetic steel sheets 3a at both ends of the rotor core 3, to sandwich and press an outer peripheral side of the rotor core 3 toward an inner side in the axial direction.

Thus, according to the rotor 1 of the permanent magnet-type rotary electric machine according to the third embodiment, the inclined surfaces 35 of the pair of endplates 31a, 31b placed at both axial ends of the rotor core 3 abut with the outer peripheries of the electromagnetic steel sheets 3a at both ends of the rotor core 3. By fastening the pair of end plates 31a, 31b by the clamping bolts 7 and the nuts 8, the inclined surfaces 35 of the pair of end plates 31a, 31b sandwich and press the outer peripheral side of the rotor core 3 toward the inner side in the axial direction. As such, even when plate thicknesses of the laminated electromagnetic steel sheets 3a are uneven, it is possible to surely eliminate a space on the outer peripheral side of the electromagnetic steel sheets 3a and to prevent a decrease of a magnetic characteristic of the rotor 30.

Further, the thickest parts of the inclined surfaces 35 of the pair of end plates 31a, 31b abut with the outer peripheries of the electromagnetic steel sheets 3a at both ends of the rotor core 3 with a small contact area, thereby making it possible to increase a pressing force to sandwich the outer peripheral side of the rotor core 3 toward the inner side in the axial direction.

Fourth Embodiment

Figure 7:
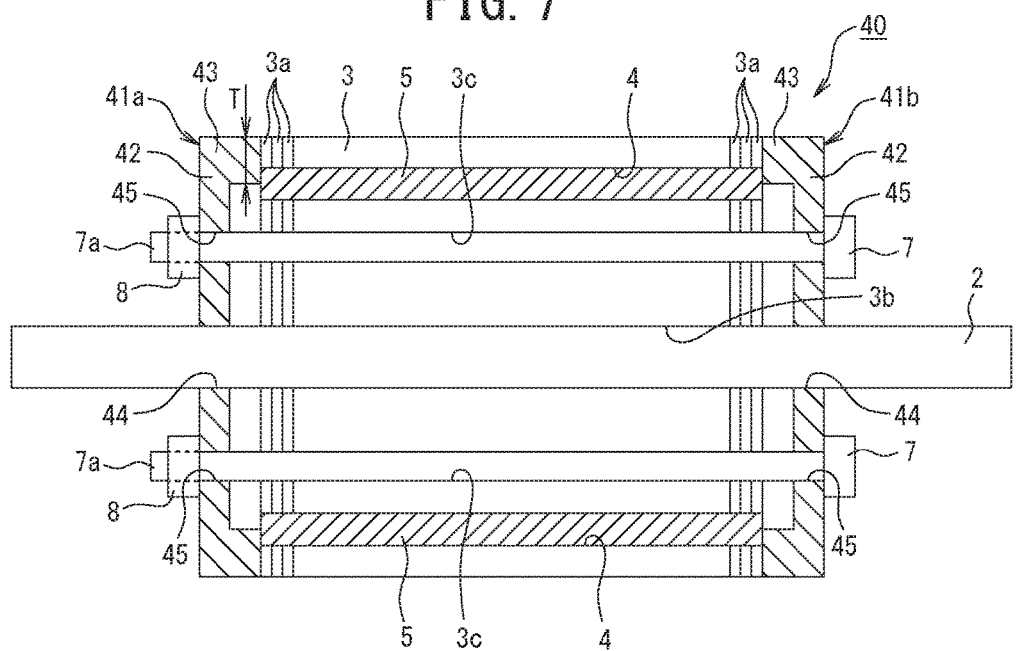
FIG. 7 is a sectional view illustrating a rotor of a permanent magnet-type rotary electric machine according to a fourth embodiment of the present invention.

Subsequently, FIG. 7 illustrates a rotor 40 of a permanent magnet-type rotary electric machine according to a fourth embodiment.

The rotor 40 according to the fourth embodiment is also different from the rotor 1 of the permanent magnet-type rotary electric machine according to the first embodiment in the structure of the end plates.

In the rotor 40 of the fourth embodiment, a pair of end plates 41a, 41b are placed at both axial ends of a rotor core 3.

One end plate 41a out of the pair of end plates 41a, 41b includes a circular flat portion 42 having generally the same outer shape as electromagnetic steel sheets 3a constituting the rotor core 3, and an annular protruding portion 43 projecting from an outer edge of the circular flat portion 42 in a direction perpendicular to a plane of the circular flat portion 9. A plate thickness T of the annular protruding portion 43 is set to a plate thickness that allows the annular protruding portion 43 to abut with an outer periphery of the electromagnetic steel sheet 3a at an end of the rotor core 3 and also to abut with part of permanent magnets 5 inserted into rotor slots 4.

In the circular flat portion 42, a shaft through hole 44 through which a rotating shaft 2 penetrates is formed in a central part thereof, and a plurality of bolt through holes 45 through which clamping bolts 7 penetrate is formed around the shaft through hole 44. Further, the other end plate 41b out of the pair of end plates 41a, 41b also has the same shape as the one end plate 41a.

Here, the pressing portion of the present invention corresponds to the annular protruding portion 43.

Then, the clamping bolts 7 are passed through the bolt through holes 45 of the pair of end plates 41a, 41b placed at both axial ends of the rotor core 3 and bolt through holes 3c of the rotor core 3, and nuts 8 are screwed onto threaded portions 7a of the clamping bolts 7 to fasten the pair of end plates 41a, 41b. Hereby, the annular protruding portions 43 of the pair of end plates 41a, 41b abut with the outer peripheries of the electromagnetic steel sheets 3a at both ends of the rotor core 3 and the permanent magnets 5 inserted into the rotor slots 4.

Thus, according to the rotor 40 of the permanent magnet-type rotary electric machine according to the fourth embodiment, the annular protruding portions 43 of the pair of endplates 41a, 41b placed at both axial ends of the rotor core 3 abut with the outer peripheries of the electromagnetic steel sheets 3a at both ends of the rotor core 3. By fastening the pair of end plates 41a, 41b by the clamping bolts 7 and the nuts 8, the annular protruding portions 43 of the pair of endplates 41a, 41b sandwich and press an outer peripheral side of the rotor core 3 toward an inner side in the axial direction. As such, even when plate thicknesses of the laminated electromagnetic steel sheets 3a are uneven, it is possible to surely eliminate a space on the outer peripheral side of the electromagnetic steel sheets 3a and to prevent a decrease of a magnetic characteristic of the rotor 40.

In addition, the annular protruding portions 43 of the pair of end plates 41a, 41b also abut with the permanent magnets 5 inserted into the rotor slots 4, so it is possible to further surely prevent movements of the permanent magnets 5 in the rotor slots 4 at the time when the rotor 40 rotates or stops.

Fifth Embodiment

Figure 8:
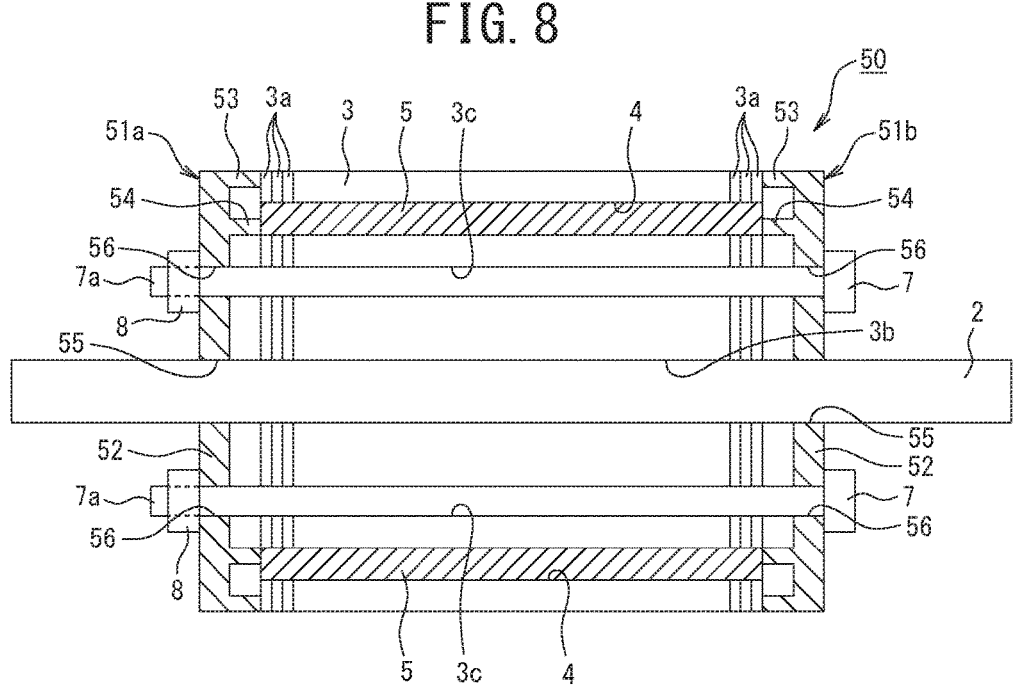
FIG. 8 is a sectional view illustrating a rotor of a permanent magnet-type rotary electric machine according to a fifth embodiment of the present invention.

Subsequently, FIG. 8 illustrates a rotor 50 of a permanent magnet-type rotary electric machine according to a fifth embodiment.

The rotor 50 according to the fifth embodiment is also different from the rotor 1 of the permanent magnet-type rotary electric machine according to the first embodiment in the structure of the end plates.

In the rotor 50 of the fifth embodiment, a pair of end plates 51a, 51b are placed at both axial ends of a rotor core 3.

One end plate 51a out of the pair of end plates 51a, 51b includes a circular flat portion 52 having generally the same outer shape as electromagnetic steel sheets 3a constituting the rotor core 3, a first annular protruding portion 53 projecting from an outer edge of the circular flat portion 52 in a direction perpendicular to a plane of the circular flat portion 9, and a second annular protruding portion 54 provided projecting on the edge side of the circular flat portion 52 and on an inner side relative to the first annular protruding portion 53.

In the circular flat portion 52, a shaft through hole 55 through which a rotating shaft 2 penetrates is formed in a central part thereof, and a plurality of bolt through holes 56 through which clamping bolts 7 penetrate is formed around the shaft through hole 44. Further, the other end plate 51b out of the pair of end plates 51a, 51b also has the same shape as the one end plate 51a.

Here, the pressing portion of the present invention corresponds to the first annular protruding portion 53 and the second annular protruding portion 54.

Then, the clamping bolts 7 are passed through the bolt through holes 56 of the pair of end plates 51a, 51b placed at both axial ends of the rotor core 3 and the bolt through holes 3c of the rotor core 3, and nuts 8 are screwed onto threaded portions 7a of the clamping bolts 7 to fasten the pair of end plates 51a, 51b. Hereby, the first annular protruding portions 53 of the pair of endplates 51a, 51b abut with outer peripheries of the electromagnetic steel sheets 3a at both ends of the rotor core 3, and the second annular protruding portions 54 of the pair of endplates 51a, 51b abut with permanent magnets 5 inserted into rotor slots 4.

Thus, according to the rotor 50 of the permanent magnet-type rotary electric machine according to the fifth embodiment, the first annular protruding portions 53 of the pair of end plates 51a, 51b placed at both axial ends of the rotor core 3 abut with the outer peripheries of the electromagnetic steel sheets 3a at both ends of the rotor core 3. By fastening the pair of end plates 51a, 51b by the clamping bolts 7 and the nuts 8, the first annular protruding portions 53 of the pair of end plates 51a, 51b sandwich and press an outer peripheral side of the rotor core 3 toward an inner side in the axial direction. As such, even when plate thicknesses of the laminated electromagnetic steel sheets 3a are uneven, it is possible to surely eliminate a space on the outer peripheral side of the electromagnetic steel sheets 3a and to prevent a decrease of a magnetic characteristic of the rotor 1.

In addition, the second annular protruding portions 54 of the pair of endplates 51a, 51b also abut with the permanent magnets 5 inserted into the rotor slots 4, so it is possible to further surely prevent movements of the permanent magnets 5 in the rotor slots 4 at the time when the rotor 50 rotates or stops.

Further, the first annular protruding portion 53 of the pair of endplates 51a, 51b can abut with the outer peripheries of the electromagnetic steel sheets 3a at both ends of the rotor core 3 with a small contact area, thereby making it possible to increase a pressing force to sandwich the outer peripheral side of the rotor core 3 toward the inner side in the axial direction.

Furthermore, the second annular protruding portions 54 of the pair of endplates 51a, 51b can abut with the permanent magnets 5 in the rotor slots 4 with a small contact area, thereby making it possible to increase a pressing force to maintain the permanent magnets 5.

Sixth Embodiment

Figure 9:
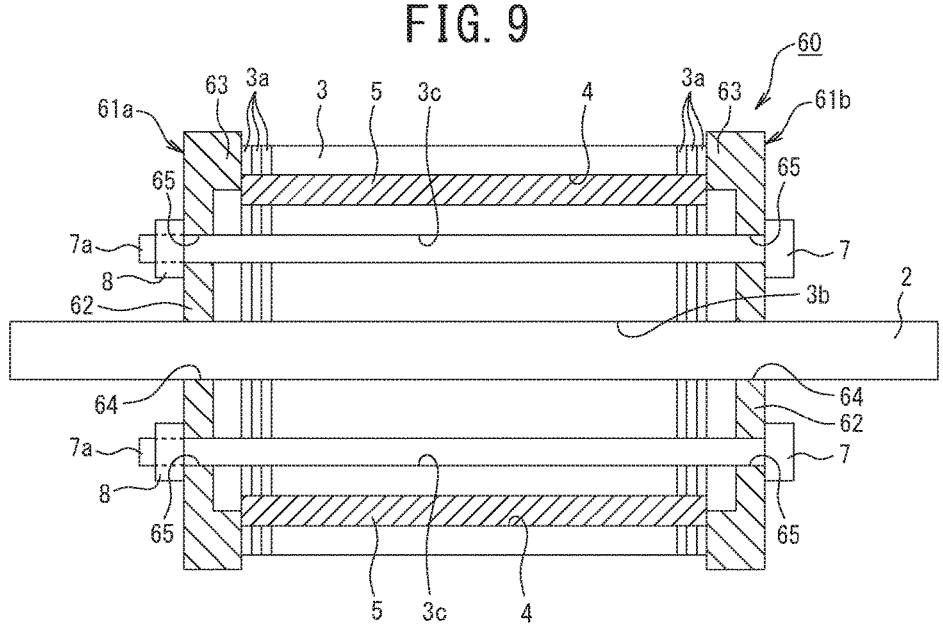
FIG. 9 is a sectional view illustrating a rotor of a permanent magnet-type rotary electric machine according to a sixth embodiment of the present invention.

Subsequently, FIG. 9 illustrates a rotor 60 of a permanent magnet-type rotary electric machine according to a sixth embodiment.

In the rotor 60 of the sixth embodiment, a pair of end plates 61a, 61b are placed at both axial ends of a rotor core 3.

One end plate 61a out of the pair of end plates 61a, 61b includes a circular flat portion 62, and an annular protruding portion 63 projecting from an outer edge of the circular flat portion 62 in a direction perpendicular to a plane of the circular flat portion 62. The annular protruding portion 63 is set to have a plate thickness that allows the annular protruding portion 63 to abut with an outer periphery of the electromagnetic steel sheet 3a at an end of the rotor core 3 and also to abut with part of permanent magnets 5 inserted into rotor slots 4. In the circular flat portion 62, a shaft through hole 64 through which a rotating shaft 2 penetrates is formed in a central part thereof, and a plurality of bolt through holes 65 through which clamping bolts 7 penetrate is formed around the shaft through hole 64.

Further, the other end plate 61b out of the pair of end plates 61a, 61b also has the same shape as the one end plate 61a.

Here, an outside diameter of the circular flat portions 62 of the pair of endplates 61a, 61b is set to be larger than an outside diameter of the rotor core 3, but smaller than an inner peripheral surface of a stator core (not illustrated).

Note that the pressing portion of the present invention corresponds to the annular protruding portion 63.

According to the rotor 60 of the permanent magnet-type rotary electric machine according to the sixth embodiment, the annular protruding portions 63 of the pair of end plates 61a, 61b placed at both axial ends of the rotor core 3 abut with outer peripheries of the electromagnetic steel sheets 3a at both ends of the rotor core 3 and the permanent magnets 5 inserted into the rotor slots 4. By fastening the pair of end plates 61a, 61b by the clamping bolts 7 and nuts 8, the annular protruding portions 63 of the pair of endplates 61a, 61b sandwich and press an outer peripheral side of the rotor core 3 and the permanent magnets 5 toward an inner side in the axial direction. As such, it is possible to surely eliminate a space on the outer peripheral side of the electromagnetic steel sheets 3a to prevent a decrease of a magnetic characteristic of the rotor 60, and it is also possible to surely fix the permanent magnets 5 in the rotor slots 4.

Further, in a case where the rotor 60 is put on a floor of a storage place in which to store the rotor 60 alone, the outside diameter of the circular flat portions 62 of the pair of end plates 61a, 61b is set to be larger than the outside diameter of the rotor core 3. From this, it is the circular flat portions 62 of the pair of end plates 61a, 61b that make contact with the floor, thereby making it possible to prevent the rotor core 3 from being damaged due to contact with the floor.

Seventh Embodiment

Figure 10:
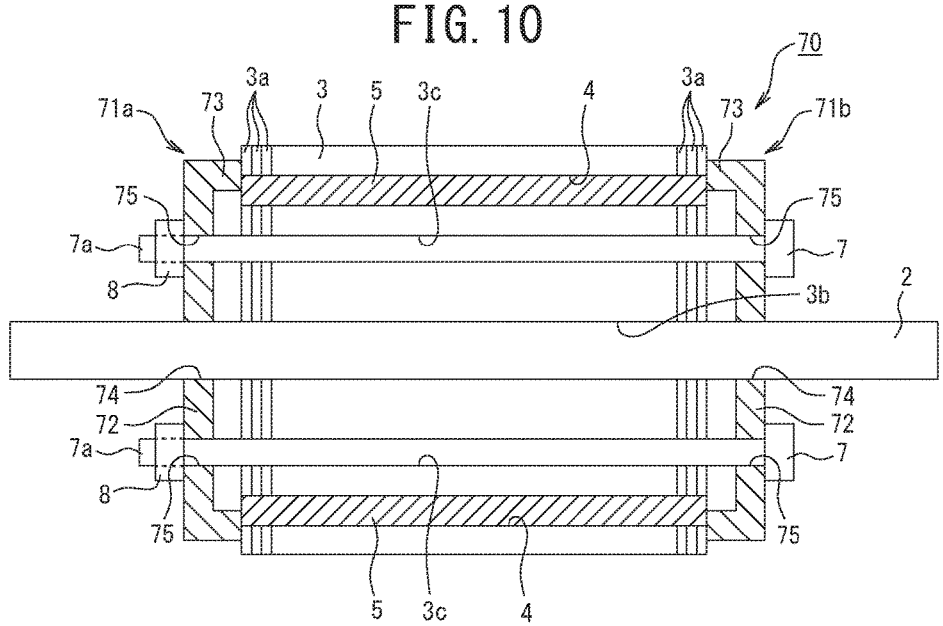
FIG. 10 is a sectional view illustrating a rotor of a permanent magnet-type rotary electric machine according to a seventh embodiment of the present invention.

Subsequently, FIG. 10 illustrates a rotor 70 of a permanent magnet-type rotary electric machine according to a seventh embodiment.

In the rotor 70 of the seventh embodiment, a pair of end plates 71*a*, 71*b* are placed at both axial ends of a rotor core 3.

One end plate 71*a* out of the pair of end plates 71*a*, 71*b* includes: a circular flat portion 72; and an annular protruding portion 73 projecting from an outer edge of the circular flat portion 72 in a direction perpendicular to a plane of the circular flat portion 72. The annular protruding portion 73 is set to have a plate thickness which allows the annular protruding portion 73 to abut with part of an electromagnetic steel sheet 3*a* of the rotor core 3, the part being placed on an outer peripheral side relative to rotor slots 4, and which also allows the annular protruding portion 73 to abut with part of permanent magnets 5 inserted into the rotor slots 4. Further, in the circular flat portion 72, a shaft through hole 74 through which a rotating shaft 2 penetrates is formed in a central part thereof, and a plurality of bolt through holes 75 through which clamping bolts 7 penetrate is formed around the shaft through hole 74.

Note that the other end plate 71*b* out of the pair of end plates 71*a*, 71*b* also has the same shape as the one end plate 71*a*.

Here, an outside diameter of the circular flat portions 62 of the pair of end plates 71*a*, 71*b* is set to be smaller than an outside diameter of the rotor core 3, but has a magnitude that allows the circular flat portions 72 to make contact with that part of the electromagnetic steel sheets 3*a* which is placed on the outer peripheral side relative to the rotor slots 4 and part of the permanent magnets 5.

Note that the pressing portion of the present invention corresponds to the annular protruding portion 73.

According to the rotor 70 of the permanent magnet-type rotary electric machine according to the seventh embodiment, the annular protruding portions 73 of the pair of end plates 71*a*, 71*b* placed at both axial ends of the rotor core 3 abut with outer peripheries of the electromagnetic steel sheets 3*a* at both ends of the rotor core 3 and the permanent magnets 5 inserted into the rotor slots 4. By fastening the pair of end plates 71*a*, 71*b* by the clamping bolts 7 and nuts 8, the annular protruding portions 73 of the pair of endplates 71*a*, 71*b* sandwich and press an outer peripheral side of the rotor core 3 and the permanent magnets 5 toward an inner side in the axial direction. As such, it is possible to surely eliminate a space on the outer peripheral side of the electromagnetic steel sheets 3*a* to prevent a decrease of a magnetic characteristic of the rotor 70, and it is also possible to surely fix the permanent magnets 5 in the rotor slots 4.

Further, since the outside diameter of the circular flat portions 72 of the pair of end plates 71*a*, 71*b* is set to be smaller than the outside diameter of the rotor core 3, in a case where the rotor 70 of the sixth embodiment axially moves relative to a stator, it is possible to prevent the rotor 70 from making contact with the stator.

Further, since the outside diameter of the circular flat portions 72 of the pair of end plates 71*a*, 71*b* is set to be smaller than the outside diameter of the rotor core 3, in a case where refrigerant circulates between an inner peripheral surface of the stator and an outer peripheral surface of the rotor 70, the pair of endplates 71*a*, 71*b* do not disturb flow of the refrigerant.

Eighth Embodiment

Figure 11:
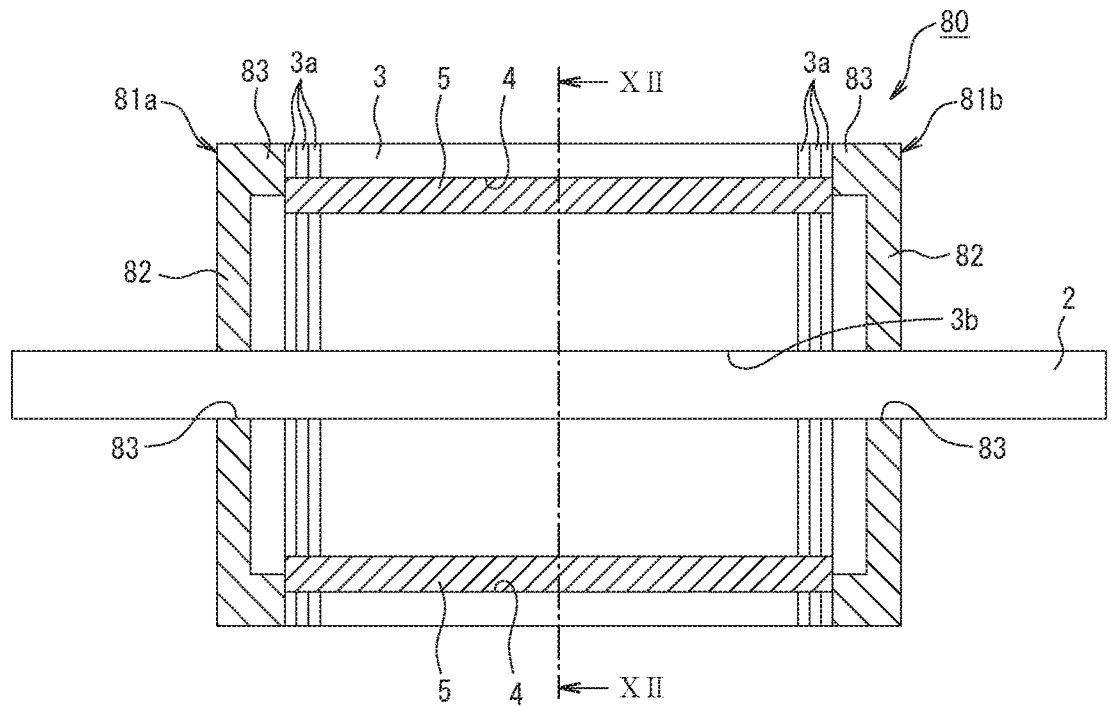
FIG. 11 is a sectional view illustrating a rotor of a permanent magnet-type rotary electric machine according to an eighth embodiment of the present invention.
Figure 12:
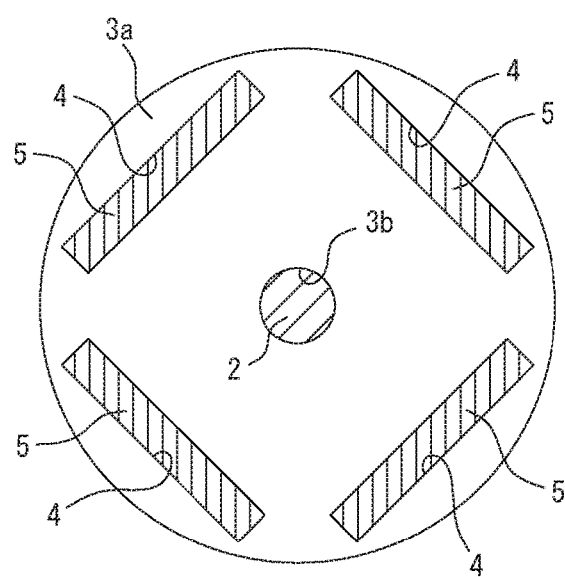
FIG. 12 is an arrow view along a line XII-XII in FIG. 11.
Figure 13A:
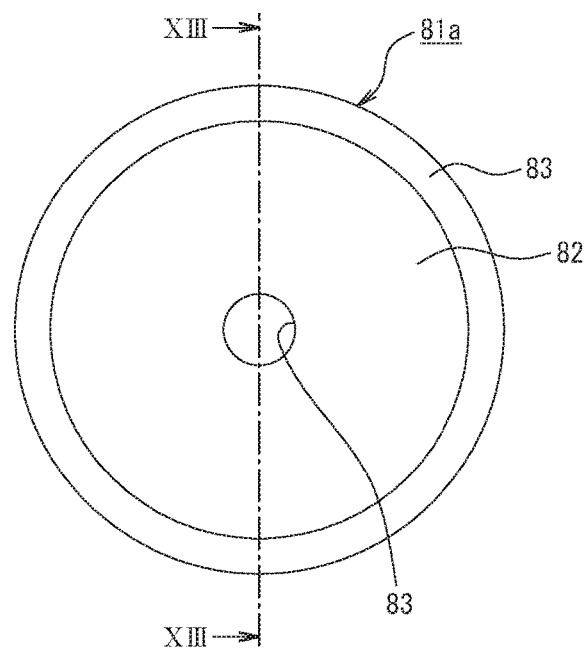
FIG. 13 is a view illustrating an endplate constituting the rotor of the permanent magnet-type rotary electric machine according to the eighth embodiment of the present invention.
Figure 13B:
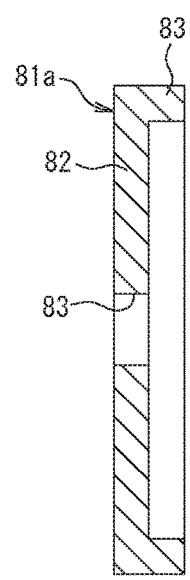

Further, FIGS. 11 to 13 illustrate a rotor 80 of a permanent magnet-type rotary electric machine according to an eighth embodiment.

In the rotor 40 of the eighth embodiment, a pair of end plates 81*a*, 81*b* are placed at both axial ends of a rotor core 3.

The rotor core 3 of the eighth embodiment is configured by a plurality of electromagnetic steel sheets 3*a*, only a shaft through hole 3*b* through which a rotating shaft 2 is penetrating is formed in each of the electromagnetic steel sheets 3*a*.

As illustrated in FIG. 13, one end plate 81*a* out of the pair of end plates 81*a*, 81*b* includes a circular flat portion 82 having generally the same outer shape as electromagnetic steel sheets 3*a* constituting the rotor core 3, and an annular protruding portion 83 projecting from an outer edge of the circular flat portion 82 in a direction perpendicular to a plane of the circular flat portion 82. A shaft through hole 84 through which the rotating shaft 2 penetrates is formed in a central part of the circular flat portion 82. The annular protruding portion 83 is set to have a plate thickness that allows the annular protruding portion 83 to abut with an outer periphery of the electromagnetic steel sheet 3*a* at an end of the rotor core 3 and also to abut with part of permanent magnets 5 inserted into rotor slots 4.

Further, the other end plate 81*b* out of the pair of end plates 81*a*, 81*b* also has the same shape as the one end plate 81*a*.

Here, the pressing portion of the present invention corresponds to the annular protruding portion 83.

The shaft through hole 3*b* of the rotor core 3 obtained by laminating the plurality of electromagnetic steel sheets 3*a* in a plate-thickness direction is shrink-fitted to the rotating shaft 2, and then, permanent magnets 5 are inserted into rotor slots 4 of the rotor core 3. After that, the pair of endplates 81*a*, 81*b* are shrink-fitted to the rotating shaft 2 by sandwiching and pressing an outer peripheral side of the rotor core 3 toward an inner side in the axial direction. Here, at the time of the shrink-fitting of the pair of end plates 81*a*, 81*b*, heat is transmitted to the permanent magnets 5 so that the permanent magnets 5 are demagnetized. Accordingly, it is desirable to magnetize the permanent magnets 5 after the shrink-fitting of the pair of end plates 81*a*, 81*b*.

When the pair of endplates 81*a*, 81*b* placed at both axial ends of the rotor core 3 are shrink-fitted to the rotating shaft 2, the annular protruding portions 83 of the pair of end plates 81*a*, 81*b* abut with outer peripheries of the electromagnetic steel sheets 3*a* at both ends of the rotor core 3 and the permanent magnets 5 inserted into the rotor slots 4.

Thus, according to the rotor 80 of the permanent magnet-type rotary electric machine according to the eighth embodiment, the annular protruding portions 83 of the pair of endplates 41*a*, 41*b* placed at both axial ends of the rotor core 3 abut with the outer peripheries of the electromagnetic steel sheets 3*a* at both ends of the rotor core 3. As such, an outer peripheral side of the rotor core 3 is sandwiched and pressed toward an inner side in the axial direction. Accordingly, even when plate thicknesses of the laminated electromagnetic steel sheets 3*a* are uneven, it is possible to surely eliminate a space on the outer peripheral side of the electromagnetic steel sheets 3a and prevent a decrease of a magnetic characteristic of the rotor 80.

Further, since the annular protruding portions 83 of the pair of end plates 81a, 81b also abut with the permanent magnets 5 inserted into the rotor slots 4, it is possible to further surely prevent movements of the permanent magnets 5 in the rotor slots 4 at the time when the rotor 80 rotates or stops.

Further, only the shaft through hole 3b penetrating through the rotating shaft 2 is formed in the rotor core 3 of the eighth embodiment, and further, only the shaft through hole 84 through which the rotating shaft 2 penetrates is formed in the circular flat portions 82 of the pair of end plates 81a, 81b. That is, since bolt through holes like the other embodiments are not formed, mechanical strength of the rotor 80 can be improved.

Note that, in the third to eighth embodiments, one end plate may be a discoid end plate that does not include a pressing portion, similarly to the second embodiment.

INDUSTRIAL APPLICABILITY

As described above, the rotor of the permanent magnet-type rotary electric machine according to the present invention is useful to restrain a decrease of a magnetic characteristic.

REFERENCE SIGNS LIST

1 . . . rotor, 2 . . . rotating shaft, 3 . . . rotor core, 3a . . . electromagnetic steel sheet, 3b . . . shaft through hole, 3c . . . bolt through hole, 4 . . . rotor slot, 5 . . . permanent magnet, 6a, 6b . . . end plate, 7 . . . clamping bolt, 7a . . . threaded portion, 8 . . . nut, 9 . . . circular flat portion, 10 . . . annular protruding portion, 11 . . . shaft through hole, 12 . . . bolt through hole, 20 . . . rotor, 21 . . . discoid end plate, 22 . . . shaft through hole, 23 . . . bolt through hole, 31a, 31b . . . end plate, 32 . . . circular plate portion, 33 . . . shaft through hole, 34 . . . bolt through hole, 35 . . . inclined surface, 40 . . . rotor, 41a, 41b . . . end plate, 42 . . . circular flat portion, 43 . . . annular protruding portion, 44 . . . shaft through hole, 45 . . . bolt through hole, 50 . . . rotor, 51a, 51b . . . end plate, 52 . . . circular flat portion, 53 . . . first annular protruding portion, 54 . . . second annular protruding portion, 55 . . . shaft through hole, 56 . . . bolt through hole, 60 . . . rotor, 61a, 61b . . . end plate, 62 . . . circular flat portion, 63 . . . annular protruding portion, 64 . . . shaft through hole, 65 . . . bolt through hole, 70 . . . rotor, 71a, 71b . . . end plate, 72 . . . circular flat portion, 73 . . . annular protruding portion, 74 . . . shaft through hole, 75 . . . bolt through hole, 80 . . . rotor, 81a, 81b . . . endplate, 82 . . . circular flat portion, 83 . . . annular protruding portion, 84 . . . shaft through hole

The invention claimed is:

1. A rotor of a permanent magnet-type rotary electric machine, the rotor including
a rotating shaft;
a rotor core configured by laminating a plurality of electromagnetic steel sheets, the rotor core including the rotating shaft penetrating through the rotor core and fixed to the rotating core;
a plurality of rotor slots formed so as to axially penetrate through the rotor core;
a plurality of permanent magnets inserted into the rotor slots;
a pair of end plates placed at both axial ends of the rotor core; and
a pressing portion provided in at least one end plate out of the pair of end plates and configured to abut with an outer peripheral side of the rotor core to apply a pressing force to the outer peripheral side of the rotor core, wherein,
bolt through holes penetrating through the plurality of electromagnetic steel sheets and the pair of end plates are formed at an outer position in a radial direction of the rotating shaft,
nuts are screwed onto clamping bolts penetrating through the bolt through holes so that the pair of end plates press the plurality of electromagnetic steel sheets toward an inner side in an axial direction,
the at least one end plate has a circular flat shape through which the rotating shaft penetrates, and is formed such that its plate thickness is thickest in its outermost periphery and the plate thickness gradually decreases toward a central part from the outermost periphery,
only the outermost periphery abuts with the rotor core as the pressing portion, and
the bolt through holes penetrate a portion of the at least one end plate that is radially inward from the outermost periphery and distanced from the rotor core.

2. The rotor of the permanent magnet-type rotary electric machine, according to claim 1, wherein,
the at least one end plate includes a circular flat portion through which the rotating shaft penetrates, and an annular protruding portion projecting from an outer edge of the circular flat portion in a direction perpendicular to the circular flat portion, so as to abut with the rotor core as the pressing portion.

3. The rotor of the permanent magnet-type rotary electric machine, according to claim 1, wherein,
an outside diameter of the end plates is set to be larger than an outside diameter of the rotor core.

4. The rotor of the permanent magnet-type rotary electric machine, according to claim 1, wherein,
an outside diameter of the end plates is set to be smaller than an outside diameter of the rotor core.

5. The rotor of the permanent magnet-type rotary electric machine, according to claim 1, wherein,
a distance between the at least one end plate and the rotor core gradually increases from the outer periphery toward the central part.

6. The rotor of the permanent magnet-type rotary electric machine, according to claim 1, wherein,
the bolt through holes are formed at positions radially outward from the rotating shaft.

7. A rotor of a permanent magnet-type rotary electric machine, the rotor including:
a rotating shaft;
a rotor core configured by laminating a plurality of electromagnetic steel sheets, the rotor core including the rotating shaft penetrating through the rotor core, to rotate integrally with the rotating shaft;
a plurality of rotor slots formed so as to axially penetrate through the rotor core;
a plurality of permanent magnets inserted into the rotor slots;
a pair of end plates placed at both axial ends of the rotor core so as to be penetrated by the rotating shaft; and
a pressing portion provided in at least one end plate out of the pair of end plates and configured to abut with an outer peripheral side of the rotor core and the permanent magnets to apply a pressing force to the outer peripheral side of the rotor core and the permanent magnets, wherein bolt through holes penetrating through the plurality of electromagnetic steel sheets and the pair of end plates are formed at an outer position in a radial direction of the rotating shaft, nuts are screwed onto clamping bolts penetrating through the bolt through holes so that the pair of end plates press the plurality of electromagnetic steel sheets toward an inner side in an axial direction, only an outermost periphery of the at least one end plate abuts with the rotor core as the pressing portion, and the bolt through holes penetrate a portion of the at least one end plate that is radially inward from the outermost periphery and distanced from the rotor core.

8. The rotor of the permanent magnet-type rotary electric machine, according to claim 7, wherein, the at least one end plate includes a circular flat portion through which the rotating shaft penetrates, and an annular protruding portion projecting from an outer edge of the circular flat portion in a direction perpendicular to the circular flat portion, so as to abut with the rotor core and the permanent magnets as the pressing portion.

9. The rotor of the permanent magnet-type rotary electric machine, according to claim 8, wherein, the annular protruding portion includes a first annular protruding portion abutting the outer peripheral side of the rotor core, and a second annular protruding portion abutting with the permanent magnets.

10. The rotor of the permanent magnet-type rotary electric machine, according to claim 9, wherein, the first annular protruding portion and the second annular protruding portion are disposed apart from each other in a radial direction.

\* \* \* \* \*